United States Patent Office 3,686,135
Patented Aug. 22, 1972

3,686,135
STABILIZER FOR HALOGEN-CONTAINING RESINS
Gary R. Mitchener, Lombard, Ill., assignor to
MacGregor Lead Company, Chicago, Ill.
No Drawing. Filed Aug. 11, 1970, Ser. No. 63,021
Int. Cl. C08f 45/56
U.S. Cl. 252—400
12 Claims

ABSTRACT OF THE DISCLOSURE

An improved stabilizer for halogen-containing resins is prepared by reacting an aqueous solution of lead oxide with a particular acid component. The acid component may be fluorosulfonic acid, a mixture of sulfuric and hydrofluoric acids, or a mixture of all three acids. The invention also relates to a method for preparing the stabilizer compositions and to halogen-containing resins stabilized with such compositions.

---

The present invention relates to an improved stabilizer for halogen-containing resins.

It is well known that halogen-containing resins are sensitive to light, heat, and aging, which result in the production of acid degradation products. This deterioration is evidenced by changes in the color of the resin, and by changes in the physical characteristics, such as flexibility and tensile strength. Since these resin compositions are exposed to heat during compounding and processing, and to light (and sometimes heat) during aging, it is common practice to incorporate agents that stabilize the resin against the aforementioned deterioration.

A wide variety of compositions have been employed in the stabilization of halogen-containing resins. Widely used as stabilizers have been the lead phthalates and sulfates. Although such stabilizers do not entirely prevent deterioration of halogen-containing resins, such deterioration is substantially reduced. However, there is a need for a resin stabilizer that even further reduces the aforementioned deterioration.

As used herein, the term "halogen-containing resins" refers to those resins that include halogen atoms (generally chlorine) as part of the resin chain, and that have a tendency to degrade and form acid degradation products when exposed to heat or light. A well known halogen-containing resin is (poly)vinyl chloride, with which the stabilizer of the present invention has been found to be particularly useful. Examples of other well known halogen-containing resins with which the stabilizer of the present invention may be employed include chlorinated polyethylene and vinyl halides copolymerized with other monomers such as vinyl acetate, vinyl chloride, and vinyl esters.

Generally, the present invention relates to an improved stabilizer for halogen-containing resins which is prepared by reacting a particular acid component with an aqueous suspension of lead oxide (litharge). The acid may be fluorosulfonic acid, a mixture of sulfuric and hydrofluoric acids, or a mixture of all three acids. In preparing the resin, the lead oxide should be present in an amount of about 0.5 to 5 moles of lead oxide for each mole of acid as fluorosulfonic acid.

The invention also provides a method for preparing the aforementioned stabilizer, which comprises reacting an acid component, which is fluorosulfonic acid and/or a mixture of sulfuric and hydrofluoric acids, with an aqueous suspension of lead oxide, the lead oxide again being present in an amount of about 0.5 to 5 moles of lead oxide for each mole of acid as fluorosulfonic acid.

Finally, the present invention provides an improved method for stabilizing halogen-containing resins wherein a stabilizer as described above is incorporated into the resin at a level of about 0.5 to 15%, based on the weight of the resin.

More specifically, it has now been found that outstanding stabilizers for halogen-containing resins may be prepared by reacting an aqueous suspension of lead oxide either with fluorosulfonic acid or with a mixture of sulfuric acid and hydrofluoric acid. Fluorosulfonic acid is a well-known composition, and may be represented by the formula:

Fluorosulfonic acid is well known to undergo hydrolysis to form sulfuric and hydrofluoric acids:

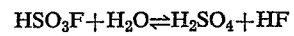

This reaction proceeds initially with great violence, and is highly exothermic. The reaction then reaches the equilibrium indicated above. Thus, an aqueous solution of fluorosulfonic acid will contain all three acids—fluorosulfonic, sulfuric, and hydrofluoric. Such a solution is highly satisfactory for carrying out the method and preparing the compositions of the present invention.

In carrying out the present invention, it has been found that it makes little difference whether fluorosulfonic acid is reacted with the lead oxide suspension, or whether a mixture of sulfuric and hydrofluoric acids is employed. When fluorosulfonic acid is used, it may be diluted, and thus at least partially hydrolyzed, prior to addition to the aqueous suspension of lead oxide. Thus, the amount of acid reactant has been defined herein as being measured "as fluorosulfonic acid." As may be seen from the foregoing equilibrium equation, one mole of sulfuric acid plus one mole of hydrofluoric acid are required to make one mole of fluorosulfonic acid. Thus, one mole of each of the latter acids is required to provide a mole of acid measured "as fluorosulfonic acid." According to the present invention, about 0.5 to 5 moles of lead oxide are employed for each mole of acid reactant as fluorosulfonic acid. Stated the reverse way, about 2 to 0.2 moles of acid are employed for each mole of lead oxide.

In preparing the compositions of the present invention lead oxide is first suspended in water. Although the proportion of lead oxide is not critical, this suspension preferably comprises about 10 to about 50 weight percent lead oxide, based upon the overall weight of the suspension.

In the most preferred embodiment, an acid catalyst is added to the lead oxide. This acid catalyst should be an acid that has an anion that forms a water-soluble lead salt. Examples of such acids include nitric, acetic, and formic acids. Acetic acid is preferred because of its ease of handling, ready availability, and low cost. The acid catalyst solubilizes or ionizes a portion of the lead molecules in the lead oxide, thus making it easier for them to react to form the compositions of the present invention, which are water-insoluble. While the reaction will proceed without such a catalyst, the catalyst is a significant aid in increasing the speed of reaction.

The reaction speed may also be increased by heating the lead oxide suspension, preferably in addition to using a catalyst. In the most preferred method, the suspension is heated to about 180–200° F. This temperature range is not critical, however, and the reaction will proceed at temperatures down to freezing, although the speed will be slower. Temperatures above the preferred range may be employed if a pressurized reaction vessel is used to prevent boiling.

The acid reactant is next added to the suspensions, preferably over a period of about one minute to one hour.

As previously mentioned, the acid may be added as fluorosulfonic acid (either in concentrated form or in aqueous solution) or as a mixture of sulfuric and hydrofluoric acids. The amount of acid employed may be varied from about 2 moles to about 0.2 moles for each mole of lead oxide, the acid being measured as fluorosulfonic acid. As the reaction proceeds, the color of the suspension is seen to change from yellow to white.

Another factor upon which reaction time depends is the amount of acid component employed. If a large amount of acid is used, in the range of about two moles of acid to one mole of lead oxide, at the preferred temperatures and with a suitable catalyst, the reaction is complete almost immediately upon addition of the acid. If, on the other hand, only about 0.2 mole of acid is employed for each mole of lead oxide, the reaction proceeds much more slowly, and requires approximately one hour at 180–200° F.

When a mixture of sulfuric and hydrofluoric acids is employed, it is preferred but not essential that the acids be present in equimolar proportions. If a significant excess of sulfuric acid is present, the product will contain excessive quantities of lead sulfate, while an excess of hydrofluoric acid will reduce excessive lead fluoride.

As a general matter, the most desirable stabilizers are those prepared with the largest amounts of lead oxide in proportion to the acid reactant. Thus, in the most preferred embodiment of the invention, about five moles of lead oxide are employed for each mole of acid as fluorosulfonic acid. If more than five moles of lead oxide are used, the color of the product is yellow instead of white, and the stabilizer would lend its yellow color to the stabilized resin compound. On the other hand, if less than 0.5 mole of lead oxide are used for each mole of acid as fluorosulfonic acid, the product becomes a very poor stabilizer.

After the reaction is complete, as shown by the development of a white color in the product, the water is removed by any well-known method such as decantation or filtration, and the product is dried.

The dried product is preferably incorporated into resins at levels of about 0.5 to 15%, based upon the weight of the resin, although the amount is not critical.

The chemical identity of the compositions prepared in accordance with the present invention is not known. It is possible that the compositions are lead fluorosulfonates, as represented by the following formula:

$$Pb(SO_3F)_2 \cdot nPbO$$

where $n$ is 0–9, depending upon the amount of lead oxide employed in the reaction. On the other hand, the composition may be a mixture of lead sulfates and lead fluorides:

$$PbSO_4 \cdot nPbO + PbF_2 \cdot mPbO$$

If such a mixture is present, it is difficult to estimate the value of $m$ and $n$. It is, of course, also possible that the fluorosulfonate, the sulfate, and the fluoride are all present in the composition. Finally, it is possible that the composition of the present invention is represented by a formula other than the above.

The following examples are intended to illustrate the present invention, and should not be construed as limitative, the scope of the invention being determined by the appended claims.

EXAMPLE I

An aqueous suspension of lead oxide was prepared with 111.5 grams of lead oxide suspended in 750 ml. of water in a 1 liter beaker equipped with a Lightning Mixer. The suspension was heated to 180–200° F., and 0.5 ml. acetic acid was added. Ten grams of concentrated fluorosulfonic acid were placed in a separatory funnel, and the fluorosulfonic acid was added to the suspension with stirring over a period of five minutes. During a period of one hour, the color was observed to gradually change from yellow to white, so that after about an hour had elapsed, the suspension was completely white.

The suspension was filtered with a Buchner funnel, and dried in an oven until the moisture content was reduced to a level below 0.5% water. Microscopic examination showed that the product consisted of finely divided crystals.

EXAMPLE II

Example I was repeated, except that the fluorosulfonic acid was diluted with 100 ml. water before being placed in the separatory funnel. The behavior of the reaction and the appearance and characteristics of the product were identical to those obtained in Example I.

EXAMPLE III

Example I was repeated, except that 50 grams of an aqueous solution containing 0.1 mole sulfuric acid and 0.1 mole hydrofluoric acid was substituted for the fluorosulfonic acid. The behavior of the reaction and the (poly)-vinyl chloride stabilizing characteristics of the product were identical to the preceding examples.

EXAMPLE IV

Example II was repeated, except that 11.1 grams fluorosulfonic acid was employed. The appearance of the product was substantially the same as in the previous examples, except that the reaction proceeded slightly faster.

EXAMPLE V

Example II was repeated, except that 20 grams of fluorosulfonic acid was employed. In this instance, the reaction proceeded significantly faster than in the previous examples. Again, the product was white and similar in appearance to that obtained in the previous examples.

EXAMPLE VI

Example II was repeated, except that 33 grams of fluorosulfonic acid was employed. The reaction proceeded very rapidly, producing a white product within a few minutes.

EXAMPLE VII

Example II was repeated, except that 100 grams of fluorosulfonic acid was employed. In this instance, the reaction was complete after five minutes when addition of the acid was completed.

EXAMPLE VIII

A (poly)vinyl chloride resin compound was prepared according to the following formulation:

100 parts (poly)vinyl chloride powder
10 parts dioctyl phthalate (plasticizer)
10 parts calcium carbonate (filler)
0.2 part calcium stearate (lubricant)

The resin compound was separated into two samples. Into the first sample, 3% (based on the (poly)vinyl chloride) of the dried product prepared in Example II was added. To serve as a standard, a commercial dibasic lead phthalate stabilizer was mixed with a second sample of resin at the same level. The samples were each subjected Cordr, wieeh a 60 ml. mixing had. 60 grams of ach (poly)-to a dynamic thermal stability test using a Brabender Plasti-Corder, with a 60 ml. mixing head. 60 grams of each (poly)vinyl chloride sample were charged to the mixing head, and the blades were run at 50 r.p.m. The mixer jacket temperature was 190° C. The plastic powder fused immediately and became homogeneous. Samples were removed periodically, and evaluated for color. The lighter the color, the more effective the stabilization. The results are shown in the following table:

| Time (Minutes) | Dibasic lead phthalate | Product of Example II |
|---|---|---|
| 10 | Slightly brownish | White. |
| 17 | Brownish cream | Cream. |
| 25 | Brown | Light brown. |
| 30 | Dark brown | Light brown. |
| 35 | Very dark brown | Brown. |

As can be seen from the foregoing table, compositions prepared in accordance with the invention contribute superior stability to that obtained with the dibasic lead phthalate stabilizer now in widespread commercial use. In fact, the color at the end of 35 minutes of this very severe test with the composition of the invention was similar to the color obtained after only 25 minutes with the dibasic lead phthalate.

Obviously, many modifications and variations of the invention as hereinbefore set forth will occur to those skilled in the art, and it is intended to cover in the appended claims all such modifications and variations as fall within the true spirit and scope of the invention.

I claim:

1. An improved stabilizer for halogen-containing resins consisting essentially of: the reaction product obtained by reacting an acid component selected from the group consisting of fluorosulfonic acid, mixtures of sulfuric and hydrofluoric acids, and mixtures of fluorosulfonic, sulfuric, and hydrofluoric acids, with an aqueous suspension of lead oxide, said lead oxide being present in an amount of about 0.5 to 5 moles of lead oxide for each mole of acid as fluorosulfonic acid.

2. The stabilizer as defined in claim 1 wherein said lead oxide is present in an amount of about 5 moles of lead oxide for each mole of acid as fluorosulfonic acid.

3. A method for preparing an improved stabilizer for halogen-containing resins comprising: reacting an acid component selected from the group consisting of fluorosulfonic acid, mixtures of sulfuric and hydrofluoric acids, and mixtures of fluorosulfonic, sulfuric, and hydrofluoric acids with an aqueous suspension of lead oxide, said lead oxide being present in an amount of about 0.5 to 5 moles of lead oxide for each mole of acid as fluorosulfonic acid.

4. The method as defined in claim 3 wherein said lead oxide is present in an amount of about 5 moles of lead oxide for each mole of acid as fluorosulfonic acid.

5. The method as defined in claim 4 wherein said acid is fluorosulfonic acid.

6. The method as defined in claim 4 wherein said acid is a mixture of sulfuric and hydrofluoric acids.

7. The method as defined in claim 4 wherein said acid is a mixture of fluorosulfonic, sulfuric, and hydrofluoric acids.

8. The method as defined in claim 3 further comprising the step of adding to said lead oxide suspension about 0.5 to about 2.0%, based on the weight of said lead oxide, of an acid catalyst having an anion that forms a water-soluble lead salt.

9. The method as defined in claim 8 wherein said acid catalyst is acetic acid.

10. The method as defined in claim 3 further comprising the step of heating said aqueous suspension to a temperature in the range of about 180–200° F., and maintaining the temperature in said range until the reaction is complete.

11. A method for preparing an improved stabilizer for halogen-containing resins comprising: heating an aqueous suspension of lead oxide to about 180–200° F.; adding about 0.5 to 2%, based on the weight of said lead oxide, of an acid catalyst having an anion that forms a water-soluble lead salt; adding about 0.2 mole of an acid selected from the group consisting of fluorosulfonic acid, mixtures of sulfuric and hydrofluoric acids, and mixtures of fluorosulfonic, sulfuric, and hydrofluoric acids, over a time period of about five minutes to about one hour while maintaining said suspension at about 180–200° F.; and drying the reaction product.

12. The method as defined in claim 11 wherein said acid catalyst is acetic acid.

References Cited

UNITED STATES PATENTS

| | | | |
|---|---|---|---|
| 2,846,412 | 8/1958 | Havens | 260—45.75 R |
| 3,002,943 | 10/1961 | Kebrich | 252—400 |
| 3,313,760 | 4/1967 | Barnes et al. | 260—45.75 R |
| 3,317,436 | 5/1967 | Szczepanek et al. | 252—400 |
| 3,536,659 | 10/1970 | Breckheimer et al. | 260—45.7 R |

LEON D. ROSDOL, Primary Examiner

I. GLUCK, Assistant Examiner

U.S. Cl. X.R.

23—152; 252—397; 260—45.75 R

Case 24,250

UNITED STATES PATENT OFFICE
CERTIFICATE OF CORRECTION

Patent No. 3,686,135          Dated  August 22, 1972

Inventor(s)   Gary R. Mitchener

It is certified that error appears in the above-identified patent and that said Letters Patent are hereby corrected as shown below:

Column 1, line 4: "MacGregor Lead Company, Chicago, Ill." should read -- American Cyanamid Company, Wayne, New Jersey --.

Column 3, line 24: "reduce" should read -- produce --.

Column 4, line 59: delete entire line reading "Cordr, wieeh a 60 ml. mixing had. 60 grams of ach (poly)-".

In the references, please list -- 3,461,081-Aug. 1969 Sugahara et al. - 252/400 --.

Signed and sealed this 3rd day of April 1973.

(SEAL)
Attest:

EDWARD M. FLETCHER, JR.
Attesting Officer

ROBERT GOTTSCHALK
Commissioner of Patents